United States Patent
Wu et al.

(10) Patent No.: US 9,613,399 B2
(45) Date of Patent: Apr. 4, 2017

(54) METHOD FOR ENHANCING COLORS OF IMAGE AND SYSTEM THEREOF

(71) Applicant: SHENZHEN CHINA STAR OPTOELECTRONICS TECHNOLOGY CO., LTD., Shenzhen (CN)

(72) Inventors: Jinjun Wu, Shenzhen (CN); Chao Ning, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 38 days.

(21) Appl. No.: 14/416,417

(22) PCT Filed: Oct. 31, 2014

(86) PCT No.: PCT/CN2014/090074
§ 371 (c)(1),
(2) Date: Jan. 22, 2015

(87) PCT Pub. No.: WO2016/058226
PCT Pub. Date: Apr. 21, 2016

(65) Prior Publication Data
US 2016/0110845 A1    Apr. 21, 2016

(30) Foreign Application Priority Data
Oct. 17, 2014   (CN) .......................... 2014 1 0553222

(51) Int. Cl.
*G06T 5/00*  (2006.01)
*H04N 1/60*  (2006.01)
(Continued)

(52) U.S. Cl.
CPC ............... *G06T 5/00* (2013.01); *H04N 1/60* (2013.01); *H04N 1/6002* (2013.01);
(Continued)

(58) Field of Classification Search
USPC .................... 382/162, 167, 254, 274–275
See application file for complete search history.

(56) References Cited

U.S. PATENT DOCUMENTS 5,450,217 A * 9/1995 Eschbach ............. H04N 1/6027
                                                                    358/518
6,868,179 B2    3/2005 Gruzdev et al.
(Continued)

FOREIGN PATENT DOCUMENTS

CN    101115211 A    1/2008
CN    101742339 A    6/2010
(Continued)

OTHER PUBLICATIONS

Office Action issued on Nov. 26, 2015, by the State Intellectual Property Office of China in corresponding Chinese Patent Application No. 201410553222.6. (6 pages).
(Continued)

*Primary Examiner* — Ishrat I Sherali
(74) *Attorney, Agent, or Firm* — Buchanan Ingersoll & Rooney PC

(57) ABSTRACT

A method and a system for enhancing colors of an image are disclosed. The method comprises: converting the color components in an RGB color space of each pixel in an image into a hue component, a saturation component, and a value component in an HSV color space of the pixel; stretching the saturation component when it is greater than 0 and smaller than 1; converting the hue component, the stretched saturation component, and the value component into an enhanced red component, an enhanced green component, and an enhanced blue component in the RGB color space. Through the method, the phenomenon of color shift can be prevented,
(Continued)

thus enabling the image to be brighter and vivider. Hence, the viewers' visual experience can be improved. The method can relieve the problems of color shift and picture washout.

10 Claims, 6 Drawing Sheets

(51) Int. Cl.
    *H04N 9/68*     (2006.01)
    *H04N 9/64*     (2006.01)

(52) U.S. Cl.
    CPC ............ *H04N 1/6027* (2013.01); *H04N 9/68* (2013.01); *G06T 2207/10024* (2013.01); *H04N 9/643* (2013.01)

(56) References Cited

U.S. PATENT DOCUMENTS 8,111,915 B2 *    2/2012    Cho ..................... H04N 1/6027
                                                    382/162

2003/0012433 A1 *    1/2003    Gruzdev ................ H04N 1/608
                                                    382/167
2007/0165946 A1      7/2007    Hong et al.
2009/0268961 A1 *   10/2009    Lu ............................ H04N 9/68
                                                    382/167
2016/0035066 A1 *    2/2016    Zhang ..................... H04N 1/60
                                                    382/167

FOREIGN PATENT DOCUMENTS

CN           102223547 A      10/2011
CN           103780797 A       5/2014

OTHER PUBLICATIONS

International Search Report and Written Opinion (Forms PCT/ISA220, PCT/ISA/237 and PCT/ISA/210) issued on Jul. 20, 2015, by the State Intellectual Property Office of China in corresponding International Application No. PCT/CN2014/090074. (11 pages).

* cited by examiner

METHOD FOR ENHANCING COLORS OF IMAGE AND SYSTEM THEREOF

The present application claims benefit of Chinese patent application CN 201410553222.6, entitled "Method for enhancing colors of image and system thereof" and filed on Oct. 17, 2014, the entirety of which is incorporated herein by reference.

FIELD OF THE INVENTION

The present disclosure relates to the technical field of image processing, and in particular, to a method for enhancing colors of an image and a system thereof.

BACKGROUND OF THE INVENTION

When a Liquid Crystal Display (LCD) has determined saturation and color gamut, an image to be displayed by the LCD can be processed by an existing method for enhancing colors of an image, wherein a red component, a green component, and a blue component in a Red Green Blue (RGB) color space of a pixel in the image can be adjusted, so as to enable the image after being processed to appear brighter.

The method for enhancing colors of an image in the prior art has the following disadvantages. At the outset, since the image is processed based on the RGB color space, the hue of the image will also be altered while the saturation thereof is being enhanced, thus causing the phenomenon of color shift. In addition, when the method for enhancing colors of an image in the prior art is used for processing the image in a portion having a relatively high saturation, the increasing amplitude of an approximately maximum saturation cannot be controlled, while the maximum saturation of the image, restricted by hardware, would not change. This would easily lead to the phenomenon of super-saturation in the portion having a relatively high saturation, thus forming color ribbons or patches.

SUMMARY OF THE INVENTION

The present disclosure aims to solve the technical problem that the phenomenon of color shift will occur when an image is processed by an existing method for enhancing colors thereof in an RGB color space such that not only the saturation of the image is increased but also the hue thereof would also be changed.

In order to solve the above technical problem, the present disclosure provides a method for enhancing colors of an image and a system thereof.

The present disclosure provides a method for enhancing colors of an image, comprising the steps of:

extracting a red component, a green component, and a blue component in an RGB color space from each pixel in the image, successively;

converting the red component, the green component, and the blue component into a hue component, a saturation component, and a value component in an HSV color space of the pixel;

judging whether the saturation component is greater than 0 and smaller than 1;

stretching the saturation component to obtain a stretched saturation component, if the saturation component is greater than 0 and smaller than 1; and converting the hue component, the stretched saturation component, and the value component into an enhanced red component, an enhanced green component, and an enhanced blue component in the RGB color space.

Preferably, stretching the saturation component comprises the steps of:

judging whether the saturation component is greater than or equal to a set saturation threshold value; and stretching the saturation component in such a manner that a greater saturation component is stretched with a smaller stretching amplitude, if the saturation component is greater than or equal to the set saturation threshold value; or stretching the saturation component in such a manner that a greater saturation component is stretched with a smaller stretching amplitude or a greater stretching amplitude, if the saturation component is smaller than the set saturation threshold value.

Preferably, the saturation component is stretched in accordance with the equation of $S1=K*\sin(0.5*\pi*S)$, wherein $S1$ and $S$ represent the stretched saturation component and the saturation component, respectively, and $K$ is a real number greater than or equal to 0 and smaller than or equal to 1.

Preferably, the saturation component is stretched in accordance with the equation of $S1=K*(0.5*\sin(\pi*S-0.5*\pi)+0.5)$, wherein $S1$ and $S$ represent the stretched saturation component and the saturation component, respectively, and $K$ is a real number greater than or equal to 0 and smaller than or equal to 1.

Preferably, $K$ equals 1.

The present disclosure further provides a system for enhancing colors of an image, comprising:

an extraction unit, configured for extracting a red component, a green component, and a blue component in an RGB color space from each pixel in the image, successively;

a first conversion unit, configured for converting the red component, the green component, and the blue component into a hue component, a saturation component, and a value component in an HSV color space of the pixel;

a first judgment unit, configured for judging whether the saturation component is greater than 0 and smaller than 1;

a saturation stretching unit, configured for stretching the saturation component to obtain a stretched saturation component, when the saturation component is greater than 0 and smaller than 1; and a second conversion unit, configured for converting the hue component, the stretched saturation component, and the value component into an enhanced red component, an enhanced green component, and an enhanced blue component in the RGB color space.

Preferably, the saturation stretching unit comprises:

a second judgment unit, configured for judging whether the saturation component is greater than or equal to a set saturation threshold value; and a first stretching unit, configured for stretching the saturation component in such a manner that a greater saturation component is stretched with a smaller stretching amplitude, when the saturation component is greater than or equal to the saturation threshold value; and a second stretching unit, configured for stretching the saturation component in such a manner that a greater saturation component is stretched with a smaller stretching amplitude or a greater stretching amplitude, when the saturation component is smaller than the saturation threshold value.

Preferably, the saturation stretching unit is specifically configured for stretching the saturation component in accordance with the equation of $S1=K*\sin(0.5*\pi*S)$, wherein $S1$ and $S$ represent the stretched saturation component and the saturation component, respectively, and K is a real number greater than or equal to 0 and smaller than or equal to 1.

Preferably, the saturation stretching unit is specifically configured for stretching the saturation component in accordance with the equation of $S1=K*(0.5*\sin(\pi*S-0.5*\pi)+0.5)$, wherein S1 and S represent the stretched saturation component and the saturation component, respectively, and K is a real number greater than or equal to 0 and smaller than or equal to 1.

Preferably, K equals 1.

Compared with the prior art, one or more embodiments of the above solutions can bring about the following advantages or beneficial effects.

When the method and the system for enhancing colors of an image according to the present disclosure are used for converting the red component, the green component, and the blue component in the RGB color space of each pixel in the image into the hue component, the saturation component, and the value component in the HSV color space, wherein the saturation component is separately stretched in the HSV color space, the phenomenon of color shift would not occur since in the above process no alteration of the hue component or the value component would be generated. As a result of this, the image will appear brighter and vivider, thereby enhancing viewers' visual experience. Meanwhile, the problems of color shift and image washout can be relieved, thus eliminating the defect of color shift that would arise when an image is processed using the method for enhancing colors thereof in the prior art.

Other features and advantages of the present disclosure will be further explained in the following description, and partly become self-evident therefrom, or be understood through implementing the present disclosure. The objectives and advantages of the present disclosure will be achieved through the structure specifically pointed out in the description, claims, and the accompanying drawings.

BRIEF DESCRIPTION OF THE DRAWINGS

The drawings are provided for further understanding of the present disclosure, and constitute one part of the description. They serve to explain the present disclosure in conjunction with the embodiments, rather than to limit the present disclosure in any manner. In the drawings.

DETAILED DESCRIPTION OF THE EMBODIMENTS

The present disclosure will be explained by reference to the following detailed description of embodiments taken in connection with the accompanying drawings, whereby it can be readily understood how to solve the technical problem by the technical means according to the present disclosure and achieve the technical effects thereof, and thus the technical solution according to the present disclosure can be implemented. It is important to note that as long as there is no conflict, combinations of the above-described embodiments and of technical features therein are possible, and technical solutions obtained in this manner are intended to be within the scope of the present disclosure.

In order to solve the technical problem that the phenomenon of color shift will occur when an image is processed by an existing method for enhancing colors thereof in an RGB color space such that not only the saturation of the image is increased but also the hue thereof would also be changed, the present disclosure provides a method which can enhance colors of an image without occurrence of color shift.

Figure 1:
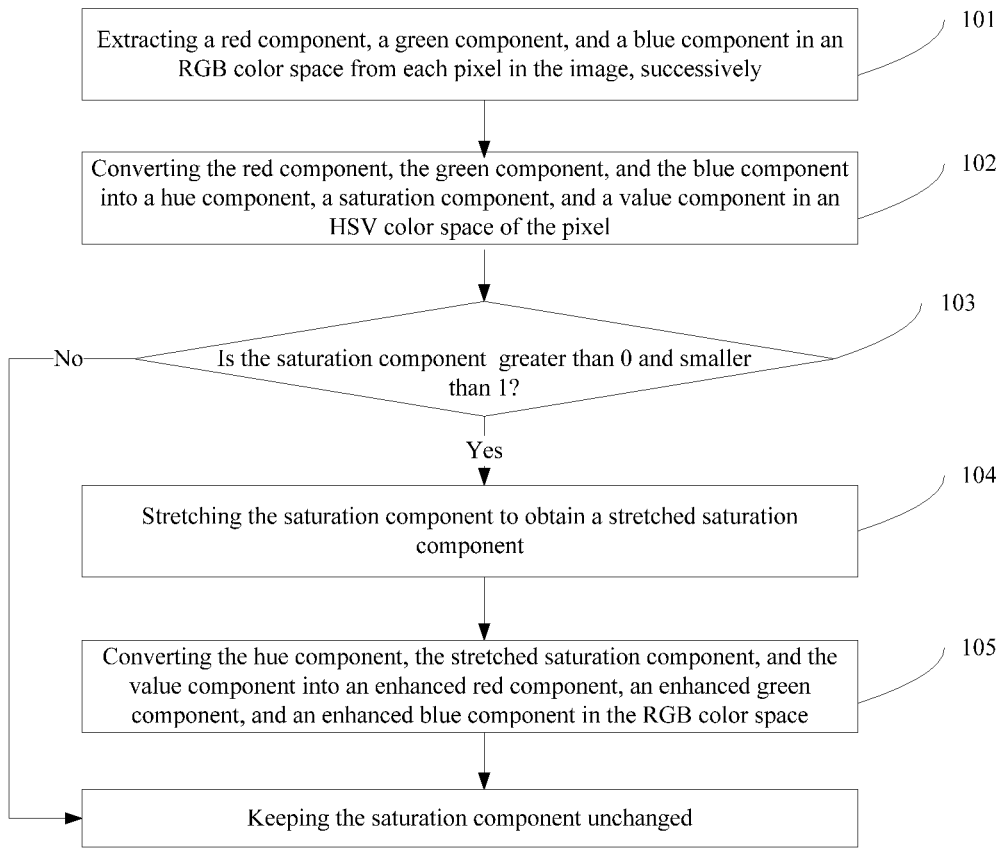
FIG. 1 shows a flow chart of a method for enhancing colors of an image according to an embodiment of the present disclosure.

FIG. 1 shows a flow chart of a method for enhancing colors of an image according to an embodiment of the present disclosure. The method for enhancing colors of an image can comprise the following steps.

In step 101, a red component R, a green component G, and a blue component B in an RGB color space are successively extracted from each pixel in the image. Specifically, the step of successively extracting the red component R, the green component G, and the blue component B in the RGB color space from each pixel in the image is a commonly-used technical means for one skilled in the art, and therefore will not be explained herein in detail.

In step 102, the red component, the green component, and the blue component are converted into a hue component H, a saturation component S, and a value component V in a Hue Saturation Value (HSV) color space of the pixel.

Specifically, R, G, and B are converted to H, S, and V through the following procedures. First, a maximum value max and a minimum value min are respectively selected among R, G, and B. Then, if R represents the maximum value max, then the hue component is calculated in accordance with the equation of $H=60*(G-B)/(max-min)$. Particularly, when H is calculated to be smaller than 0, the hue component is determined to be H+360. If G represents the maximum value max, then the hue component is calculated in accordance with the equation of $H=60*(2+(B-R)/(max-min))$. Particularly, when H is calculated to be smaller than 0, the hue component is determined to be H+360. If B represents the maximum value max, then the hue component is calculated in accordance with the equation of $H=60*(4+(R-G)/(max-min))$. Particularly, when H is calculated to be smaller than 0, the hue component is determined to be H+360. Subsequently, the maximum value max is determined to the value component. Finally, the saturation component is calculated in accordance with the equation of $S=(max-min)/max=1-min/max$.

In step 103, the saturation component is judged whether to be greater than 0 and smaller than 1.

In step 104, the saturation component is stretched to obtain a stretched saturation component S1, if yes in step 103; or the saturation component is maintained, if no in step 103.

Specifically, if the saturation component obtained through conversion is 0, the corresponding pixel thereof should be gray, while if the saturation component obtained through conversion is 1, the corresponding pixel thereof should be a solid color. The saturation component of a gray or solid pixel will not be stretched, and therefore will remain unchanged. If the saturation component obtained through conversion corresponds to an ordinary color, i.e., the saturation component is greater than 0 and smaller than 1, it should be stretched. That is, the saturation component should be increased to obtain the stretched saturation component.

In step 105, the hue component, the stretched saturation component, and the value component are converted into an enhanced red component R1, an enhanced green component G1, and an enhanced blue component B1 in the RGB color space.

Specifically, after the saturation component has been stretched (the saturation component is kept unchanged for a gray or solid pixel), the hue component and the value component obtained in step 102 and the stretched saturation component obtained in step 104 are converted into the enhanced red component R1, the enhanced green component G1, and the enhanced blue component B1 in the RGB color space.

H, S1, and V can be converted into R1, G1, and B1 in the RGB color space through the following procedures. First, S1 is judged whether to equal 0. If yes, it will be determined that R1=G1=B1=V. If no, some values, i.e., i, a, b, and c, will be calculated respectively in accordance with the following equations: i=INTEGER(H/60), a=V*(1−S1), b=V*(1−S1*(H/60−i)), and c=V*(1−S1*(1−(H/60−i))). When i equals 0, it is determined that R1, G1, and B1 equal the value component, c, and a, respectively; when i equals 1, it is determined that R1, G1, and B1 equal b, the value component, and a, respectively; when i equals 2, it is determined that R1, G1, and B1 equal a, the value component, and c, respectively; when i equals 3, it is determined that R1, G1, and B1 equal a, b, and the value component, respectively; when i equals 4, it is determined that R1, G1, and B1 equal c, a, and the value component, respectively; and when i equals 5, it is determined that R1, G1, and B1 equal the value component, a, and b, respectively.

When the method for enhancing colors of an image according to the present embodiment is used for converting the red component, the green component, and the blue component in the RGB color space of each pixel in the image into the hue component, the saturation component, and the value component in the HSV color space, wherein the saturation component is separately stretched in the HSV color space, the phenomenon of color shift would not occur since no alteration of the hue component or the value component would occur. As a result of this, the image will appear brighter and vivider, thereby enhancing viewers' visual experience. Meanwhile, the problems of color shift and image washout can be relieved, thus eliminating the defect of color shift that would arise when an image is processed using the method for enhancing colors thereof in the prior art.

Figure 2:
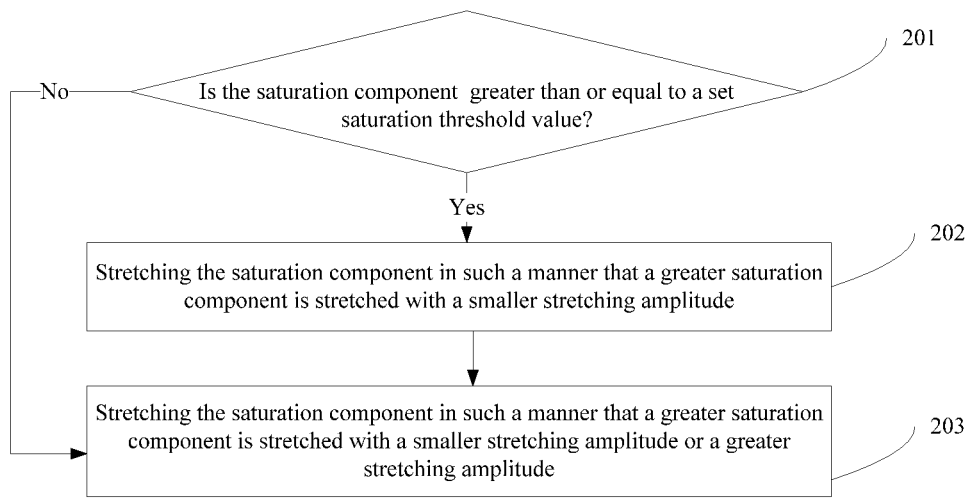
FIG. 2 shows a flow chart of a method for stretching a saturation component according to an embodiment of the present disclosure.

The present disclosure also aims to remove another defect existing in the method for enhancing colors of an image in the prior art, i.e., easy occurrence of super-saturation in a portion having a relatively high saturation and thus formation of color ribbons or patches when the portion having a relatively high saturation is processed, due to the fact that the increasing amplitude of an approximately maximum saturation cannot be controlled, while the maximum saturation of the image, restricted by hardware, would not change. In one preferred embodiment of the present disclosure, a preferable method for stretching the saturation component is provided. FIG. 2 shows a flow chart of a method for stretching a saturation component according to an embodiment of the present disclosure, wherein stretching the saturation component to obtain the stretched saturation component can comprise the following steps.

In step 201, the saturation component is judged whether to be greater than or equal to a set saturation threshold value.

In step 202, the saturation component is stretched in such a manner that a greater saturation component is stretched with a smaller stretching amplitude, if the saturation component is greater than or equal to the set saturation threshold value.

Specifically, one skilled in the art can set the saturation threshold value as actually required by the implementing environment. In particular, the saturation threshold value can be determined as 0.5, and thus saturation components greater than 0.5 can be stretched in such a manner that a greater saturation component is stretched with a smaller stretching amplitude (i.e., an increasing proportion of the saturation component). As a result, a high saturation component, especially that close to 100%, would have a small increasing amplitude.

In step 203, the saturation component is stretched in such a manner that a greater saturation component is stretched with a smaller stretching amplitude or a greater stretching amplitude, if the saturation component is smaller than the set saturation threshold value.

Specifically, the stretching amplitude of a saturation component smaller than the set saturation threshold value is less restricted. That is, the saturation component smaller than the set saturation threshold value is stretched in such a manner that a greater saturation component is stretched with a smaller stretching amplitude or a greater stretching amplitude.

In the present embodiment, different saturation components are stretched in different manners. Comparatively high saturation components can be stretched in such a manner that a greater saturation component is stretched with a smaller stretching amplitude, while comparatively low saturation components are stretched in such a manner that a greater saturation component is stretched either with a smaller stretching amplitude or with a greater stretching amplitude. Through the above stretching manners, the increasing amplitude of an approximate 100% saturation component of a pixel will not be very large. Therefore, super-saturation will be prevented in a portion having a relatively high saturation, thus avoiding occurrence of color ribbons or patches.

Figure 3:
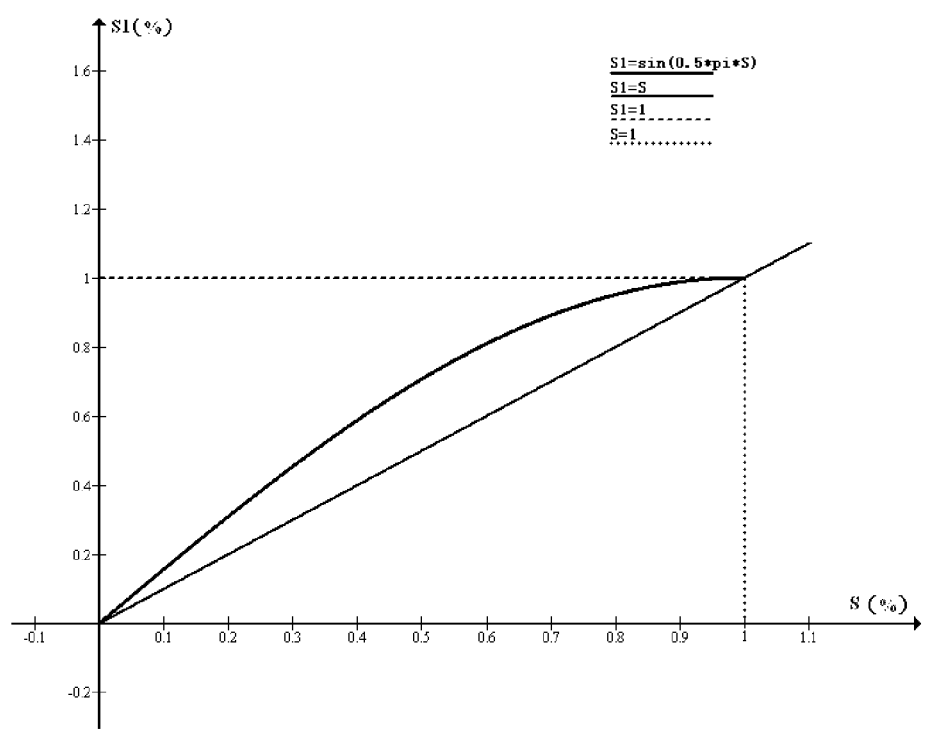
FIG. 3 shows a curve chart of a stretching function used for stretching a saturation component according to an embodiment of the present disclosure.
Figure 4:
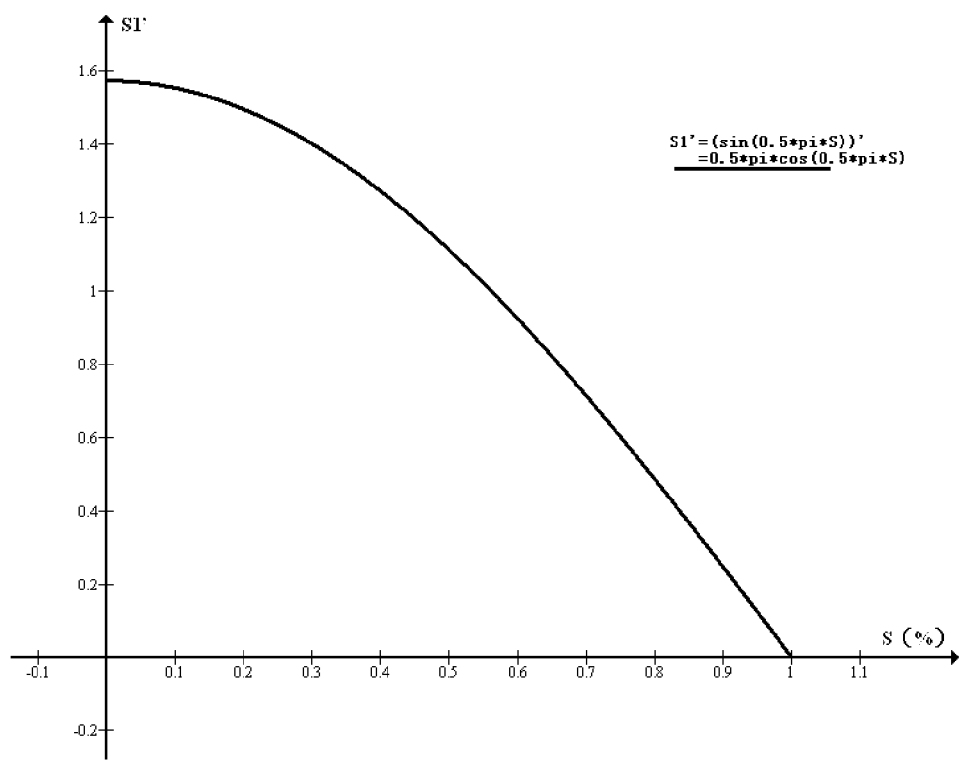
FIG. 4 shows a curve chart of the derived function of the stretching function as shown in FIG. 3.

A first preferred stretching manner will be explained with reference to FIGS. 3 and 4.

In the first stretching manner, the saturation component can be stretched in accordance with the equation of $S1=K*\sin(0.5*\pi*S)$, wherein S1 and S represent the stretched saturation component and the saturation component, respectively, and K is a real number greater than or equal to 0 and smaller than or equal to 1. FIG. 3 shows a curve chart of a stretching function $S1=K*\sin(0.5*\pi*S)$ used for stretching a saturation component according to an embodiment of the present disclosure, wherein K equals 1; and FIG. 4 shows a curve chart of the derived function $S1'=0.5*\pi*\cos(0.5*\pi*S)$ of the stretching function $S1=\sin(0.5*\pi*S)$ as shown in FIG. 3. The thick solid line in FIG. 3 represents the curved line corresponding to the stretching function, and the thin solid line therein represents the reference curved line S1=S, while the two dotted lines are respectively a horizontal line and a vertical line for convenient reading of the figure. As can be seen, when the saturation component S equals 0 or 1, it will stay unchanged after being stretched, while when the saturation component S increases within the range of (0, 1), the stretched saturation component S1 will non-linearly increase in the range of (0, 1) also, wherein the stretched saturation component S1 is always greater than the saturation component S. Besides, as FIG. 4 shows, when the saturation component S increases within the range of (0, 1), the stretching proportion of the stretched saturation component S1 gradually drops, thus ensuring smooth transition of the stretched saturation component S1. As a result, the phenomenon of super-saturation will not appear, thereby avoiding occurrence of color ribbons or patches.

It is important to note that, in the present embodiment, when the saturation component is stretched in accordance with the above stretching function $S1=\sin(0.5*\pi*S)$, the stretching manner as shown in FIG. 2 is used, wherein the saturation threshold value is set as any real number in the range of [0, 1]. The saturation component is stretched, regardless of what the relationship between the saturation component and the saturation threshold value is, in such a manner that a greater saturation component is stretched with a smaller amplitude.

Figure 5:
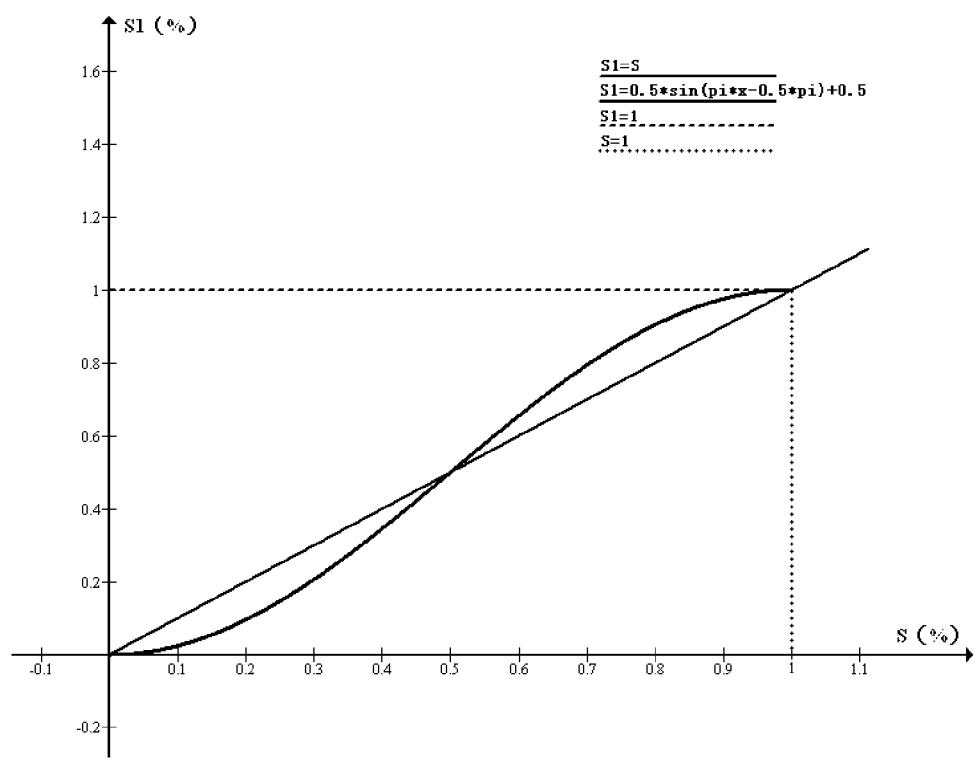
FIG. 5 shows a curve chart of another stretching function used for stretching a saturation component according to an embodiment of the present disclosure.
Figure 6:
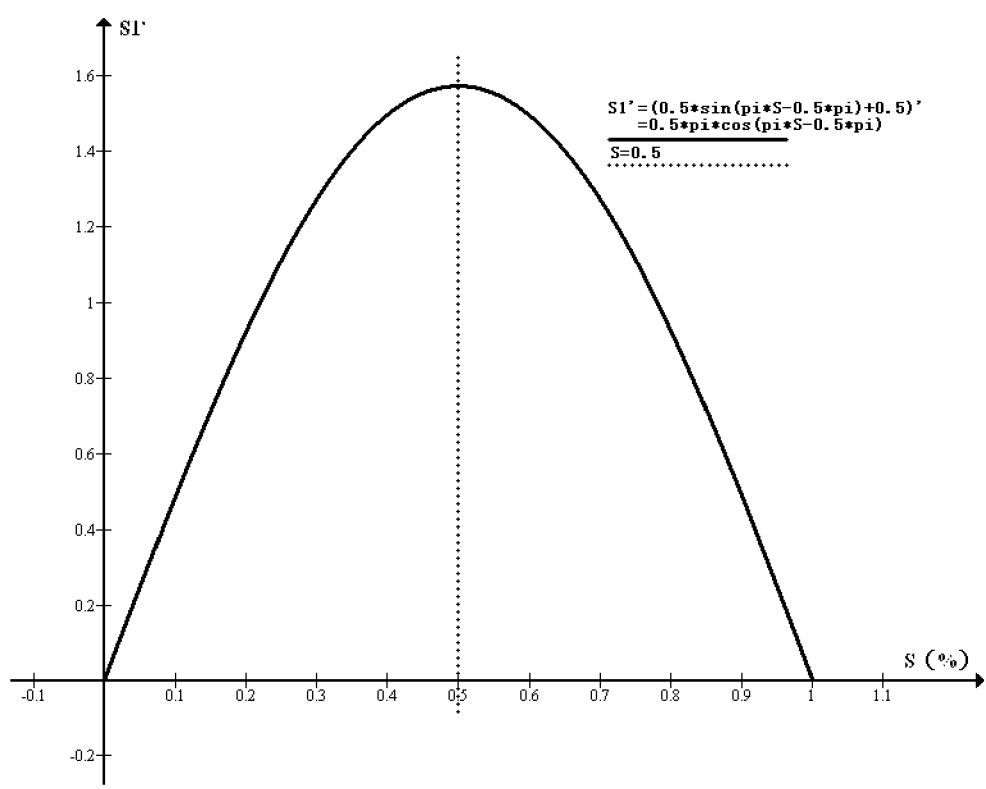
FIG. 6 shows a curve chart of the derived function of the stretching function as shown in FIG. 5.

A second preferred stretching manner will be explained with reference to FIGS. 5 and 6.

In the second stretching manner, the saturation component can be stretched in accordance with the equation of $S1=K*(0.5*\sin(\pi*S-0.5*\pi)+0.5)$, wherein S1 and S represent the stretched saturation component and the saturation component, respectively, and K is a real number greater than or equal to 0 and smaller than or equal to 1. FIG. 5 shows a curve chart of a stretching function $S1=K*(0.5*\sin(\pi*S-0.5*\pi)+0.5)$ used for stretching a saturation component according to an embodiment of the present disclosure, wherein K equals 1; and FIG. 6 shows a curve chart of the derived function $S1'=0.5*\pi*\cos(\pi*S-0.5*\pi)$ of the stretching function $S1=0.5*\sin(\pi*S-0.5*\pi)+0.5$ as shown in FIG. 5. The thick solid line in FIG. 5 represents the curved line corresponding to the stretching function, and the thin solid line therein represents the reference curved line S1=S, while the two dotted lines are respectively a horizontal line and a vertical line for convenient reading of the figure. As can be seen, when the saturation component S equals 0 or 1 which are respectively the end values of the defined range, it will stay unchanged after being stretched, while when the saturation component S increases within the range of (0, 1), the stretched saturation component S1 will non-linearly increase in the range of (0, 1) also. The stretched saturation component S1 is always smaller than the saturation component S when the saturation component S increases within the range of (0, 0.5], while the stretched saturation component S1 is always greater than the saturation component S when the saturation component S increases within the range of (0.5, 1). As a result, when a pixel has a saturation component lower than 0.5, the stretched saturation component thereof would be even lower, and when a pixel has a saturation component higher than 0.5, the stretched saturation component thereof would be even higher. This would lead to more effective layering of an image through more notable contrast. Furthermore, as FIG. 6 shows, when the saturation component S increases within the range of (0, 0.5], the stretching proportion of the stretched saturation component S1 gradually increases, and when the saturation component S increases within the range of (0.5, 1), the stretching proportion of the stretched saturation component S1 gradually drops. This ensures smooth transition of the stretched saturation component S1. As a result, the phenomenon of super-saturation will not appear, thereby avoiding occurrence of color ribbons or patches.

It is important to note that, in the present embodiment, when the saturation component is stretched in accordance with the above stretching function $S1=0.5*\sin(\pi*S-0.5*\pi)+0.5$, the stretching manner as shown in FIG. 2 is used, wherein the saturation threshold value is set as 0.5. When the saturation component is greater than or equal to 0.5, it is stretched in such a manner that a greater saturation component is stretched with a smaller amplitude; and when the saturation component is smaller than 0.5, it is stretched in such a manner that a greater saturation component is stretched with a greater amplitude.

In the above embodiment, K is a real number in the range of [0, 1], and can be adjusted according to the requirements of users in the implementation of the embodiment. In an extreme case, when K equals 0, the stretched saturation component is 0, and a color picture turns into black and white. In a preferred embodiment of the present disclosure, in order to prevent the stretched saturation component from declining, K is assigned to be 1.

Figure 7:
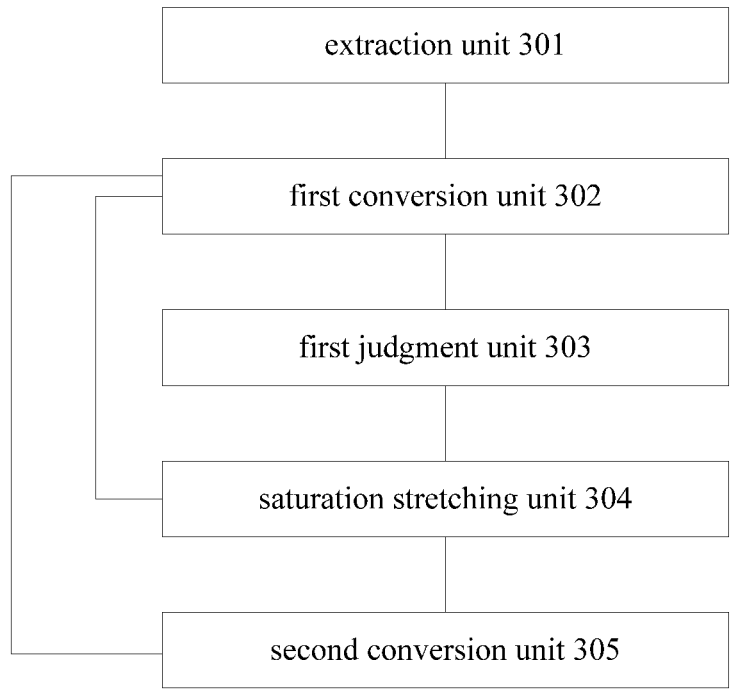
FIG. 7 shows a structural diagram of a system for enhancing colors of an image according to an embodiment of the present disclosure.

Correspondingly, the embodiment of the present disclosure further provides a system for enhancing colors of an image. FIG. 7 shows a structural diagram of the system for enhancing colors of an image.

The system comprises:

an extraction unit 301, configured for extracting a red component, a green component, and a blue component in an RGB color space from each pixel in the image, successively;

a first conversion unit 302, configured for converting the red component, the green component, and the blue component into a hue component, a saturation component, and a value component in an HSV color space of the pixel;

a first judgment unit 303, configured for judging whether the saturation component is greater than 0 and smaller than 1;

a saturation stretching unit 304, configured for stretching the saturation component to obtain a stretched saturation component, when the saturation component is greater than 0 and smaller than 1; and a second conversion unit 305, configured for converting the hue component, the stretched saturation component, and the value component into an enhanced red component, an enhanced green component, and an enhanced blue component in the RGB color space.

When the system for enhancing colors of an image according to the present embodiment is used for converting the red component, the green component, and the blue component in the RGB color space of each pixel in the image into the hue component, the saturation component, and the value component in the HSV color space, wherein the saturation component is separately stretched in the HSV color space, the phenomenon of color shift would not occur since no alteration of the hue component or the value component would be generated. As a result of this, the image will appear brighter and vivider, thereby enhancing viewers' visual experience. Meanwhile, the problems of color shift and image washout can be relieved, thus eliminating the defect of color shift that would arise when an image is processed using the method for enhancing colors thereof in the prior art.

Figure 8:
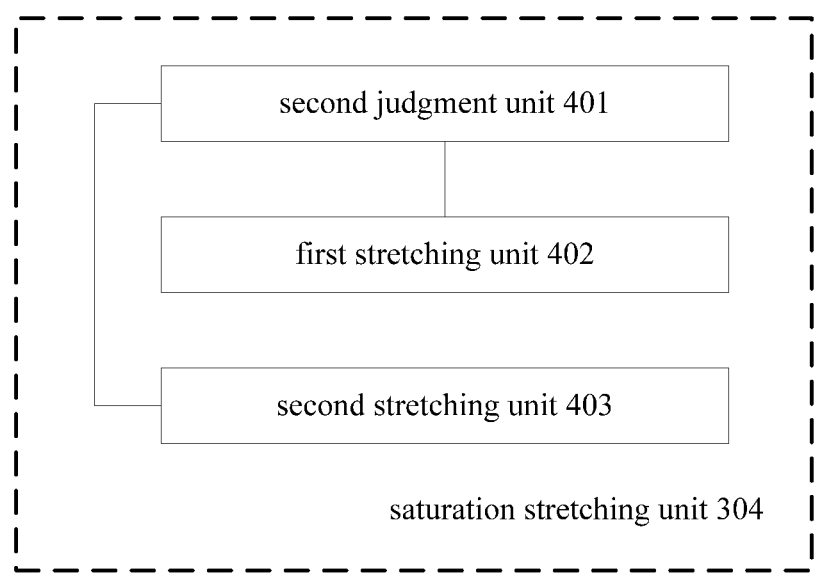
FIG. 8 shows a structural diagram of a saturation stretching unit according to an embodiment of the present disclosure.

Further, FIG. 8 shows a structural diagram of the saturation stretching unit 304 according to the embodiment of the present disclosure.

The saturation stretching unit 304 comprises:

a second judgment unit 401, configured for judging whether the saturation component is greater than or equal to a set saturation threshold value; and a first stretching unit 402, configured for stretching the saturation component in such a manner that a greater saturation component is stretched with a smaller stretching amplitude, when the saturation component is greater than or equal to the saturation threshold value; and a second stretching unit 403, configured for stretching the saturation component in such a manner that a greater saturation component is stretched with a smaller stretching amplitude or a greater stretching amplitude, when the saturation component is smaller than the saturation threshold value.

In the present embodiment, different saturation components are stretched in different manners. Comparatively high saturation components can be stretched in such a manner that a greater saturation component is stretched with a smaller stretching amplitude, while comparatively low saturation components are stretched in such a manner that a greater saturation component is stretched either with a smaller stretching amplitude or with a greater stretching amplitude. Through the above stretching manners, the increasing amplitude of an approximate 100% saturation component of a pixel will not be very large. Therefore, super-saturation will be prevented in a portion having a relatively high saturation, thus avoiding occurrence of color ribbons or patches.

In a preferred embodiment of the present disclosure, the saturation stretching unit 304 can be specifically configured as stretching the saturation component in accordance with the equation of $S1=K*\sin(0.5*\pi*S)$, wherein S1 and S represent the stretched saturation component and the saturation component, respectively, and K is a real number greater than or equal to 0 and smaller than or equal to 1.

In another preferred embodiment of the present disclosure, the saturation stretching unit 304 can be specifically configured as stretching the saturation component in accordance with the equation of $S1=(0.5*\sin(\pi*S-0.5*\pi)+0.5)$, wherein S1 and S represent the stretched saturation component and the saturation component, respectively, and K is a real number greater than or equal to 0 and smaller than or equal to 1. In the present embodiment, when a pixel has a saturation component lower than 0.5, the stretched saturation component thereof would be even lower, and when a pixel has a saturation component higher than 0.5, the stretched saturation component thereof would be even higher. This would lead to more effective layering of an image through more notable contrast.

In the above two preferred embodiments, K is preferably equal to 1.

For specific processing steps of the above units, reference can be made to the description of the method in the embodiments of the present disclosure, which will not be repeated here.

One skilled in the art can understand that the above modules or steps of the present disclosure can each be achieved through a general computer device. They can be concentrated in one individual computer device, or can be distributed among a network composed by a plurality of computer devices. Optionally, they can be realized by a program code that is executable in a computer device, and thereby executed by a calculation device via being stored in a storage unit. Alternately, they can be realized by being manufactured into integrated circuit modules respectively, or multiple modules or steps of them can be realized by being manufactured into one integrated circuit module. Thus, the present disclosure is not limited to a combination of any specific hardware or software.

While the embodiments of the present disclosure are described above, the description should not be construed as limitations of the present disclosure, but merely as embodiments for readily understanding the present disclosure. Anyone skilled in the art, within the spirit and scope of the present disclosure, can make amendments or modification to the implementing forms and details of the embodiments. Hence, the scope of the present disclosure should be subject to the scope defined in the claims.

The invention claimed is:

1. A method for enhancing colors of an image, comprising the steps of:
    extracting a red component, a green component, and a blue component in an RGB color space from each pixel in the image, successively;
    converting the red component, the green component, and the blue component into a hue component, a saturation component, and a value component in an HSV color space of the pixel;
    judging whether the saturation component is greater than 0 and smaller than 1;
    stretching the saturation component to obtain a stretched saturation component, if the saturation component is greater than 0 and smaller than 1; and
    converting the hue component, the stretched saturation component, and the value component into an enhanced red component, an enhanced green component, and an enhanced blue component in the RGB color space,
    wherein stretching the saturation component comprises the steps of:
    judging whether the saturation component is greater than or equal to a set saturation threshold value; and
    stretching the saturation component in such a manner that a greater saturation component is stretched with a smaller stretching amplitude, if the saturation component is greater than or equal to the set saturation threshold value; or
    stretching the saturation component in such a manner that a greater saturation component is stretched with a smaller stretching amplitude or a greater stretching amplitude, if the saturation component is smaller than the set saturation threshold value.

2. The method according to claim 1, comprising stretching the saturation component in accordance with the equation of $S1=K*\sin(0.5*\pi*S)$ wherein S1 and S represent the stretched saturation component and the saturation component, respectively, and K is a real number greater than or equal to 0 and smaller than or equal to 1.

3. The method according to claim 1, comprising stretching the saturation component in accordance with the equation of $S1=K*(0.5*\sin(\pi*S-0.5*\pi)+0.5)$, wherein S1 and S represent the stretched saturation component and the saturation component, respectively, and K is a real number greater than or equal to 0 and smaller than or equal to 1.

4. The method according to claim 2, wherein K equals 1.

5. The method according to claim 3, wherein K equals 1.

6. A system for enhancing colors of an image, comprising:
    an extraction unit, configured for extracting a red component, a green component, and a blue component in an RGB color space from each pixel in the image, successively;
    a first conversion unit, configured for converting the red component, the green component, and the blue component into a hue component, a saturation component, and a value component in an HSV color space of the pixel;

a first judgment unit, configured for judging whether the saturation component is greater than 0 and smaller than 1;

a saturation stretching unit, configured for stretching the saturation component to obtain a stretched saturation component when the saturation component is greater than 0 and smaller than 1; and a second conversion unit, configured for converting the hue component, the stretched saturation component, and the value component into an enhanced red component, an enhanced green component, and an enhanced blue component in the RGB color space, wherein the saturation stretching unit comprises:

a second judgment unit, configured for judging whether the saturation component is greater than or equal to a set saturation threshold value; and a first stretching unit, configured for stretching the saturation component in such a manner that a greater saturation component is stretched with a smaller stretching amplitude, when the saturation component is greater than or equal to the saturation threshold value; and a second stretching unit, configured for stretching the saturation component in such a manner that a greater saturation component is stretched with a smaller stretching amplitude or a greater stretching amplitude, when the saturation component is smaller than the saturation threshold value.

7. The system according to claim 6, wherein the saturation stretching unit is specifically configured for stretching the saturation component in accordance with the equation of $S1=K*\sin(0.5*\pi*S)$, wherein S1 and S represent the stretched saturation component and the saturation component, respectively, and K is a real number greater than or equal to 0 and smaller than or equal to 1.

8. The system according to claim 6, wherein the saturation stretching unit is specifically configured for stretching the saturation component in accordance with the equation of $S1=K*(0.5*\sin(\pi*S-0.5*\pi)+0.5)$, wherein S1 and S represent the stretched saturation component and the saturation component, respectively, and K is a real number greater than or equal to 0 and smaller than or equal to 1.

9. The system according to claim 7, wherein K equals 1.

10. The system according to claim 8, wherein K equals 1.

* * * * *